(12) United States Patent
Huber, Jr. et al.

(10) Patent No.: US 10,501,097 B2
(45) Date of Patent: Dec. 10, 2019

(54) AUTOMATIC PARKING BRAKE FOR TRUCK MOUNTED BRAKE CYLINDER

(71) Applicant: NEW YORK AIR BRAKE, LLC, Watertown, NY (US)

(72) Inventors: Howard Huber, Jr., Black River, NY (US); Keith Parnapy, North Bangor, NY (US); Robert Neulieb, Theresa, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

(21) Appl. No.: 16/129,985

(22) Filed: Sep. 13, 2018

(65) Prior Publication Data

US 2019/0016353 A1 Jan. 17, 2019

Related U.S. Application Data

(60) Division of application No. 15/788,104, filed on Oct. 19, 2017, now Pat. No. 10,106,179, which is a continuation of application No. 14/679,119, filed on Apr. 6, 2015, now Pat. No. 9,821,822.

(51) Int. Cl.
| | |
|---|---|
| *F16D 69/00* | (2006.01) |
| *B61H 13/00* | (2006.01) |
| *B61H 13/02* | (2006.01) |
| *B61H 13/34* | (2006.01) |
| *B60T 17/16* | (2006.01) |
| *B60T 7/12* | (2006.01) |

(Continued)

(52) U.S. Cl.
CPC .............. *B61H 13/00* (2013.01); *B60T 7/128* (2013.01); *B60T 13/665* (2013.01); *B60T 17/16* (2013.01); *B61H 13/02* (2013.01); *B61H 13/34* (2013.01); *F16D 2127/06* (2013.01)

(58) Field of Classification Search
CPC ............. F16D 2127/02; F16D 2127/04; F16D 2127/06; B60T 17/08; B60T 17/10; B60T 17/16; B60T 11/105; B61H 13/02; B61H 13/04; B61H 13/26; B61H 13/005
See application file for complete search history.

(56) References Cited

U.S. PATENT DOCUMENTS 6,186,284 B1 * 2/2001 Sauter ................... B60T 17/228
188/196 R
6,279,689 B1 * 8/2001 Zemyan ................ B60T 13/581
188/153 R (Continued)

*Primary Examiner* — Nicholas J Lane
(74) *Attorney, Agent, or Firm* — Bond Schoeneck and King PLLC; David Nocilly

(57) ABSTRACT

An automatic parking brake for a truck mounted brake cylinder. The automatic parking brake includes rod that is interconnected to a piston of the brake cylinder and can prevent the piston from returning to the brakes releases position. The rod is controlled by locking nut that will rotate if the rod moves axially through the locking nut and a locking sleeve that is moveable between a locked position, where the locking sleeve engages the locking nut and prevents from the nut from rotating, and a released position, where the locking sleeve is disengages from the locking nut and the locking nut is free to rotate. A spring provides a force biasing the locking nut into the locked position, and brake pipe pressure biases the locking sleeve into the released position.

7 Claims, 20 Drawing Sheets

(51) Int. Cl.
    *B60T 13/66*       (2006.01)
    *F16D 127/06*    (2012.01)

(56) References Cited

U.S. PATENT DOCUMENTS

| | | | |
|---|---|---|---|
| 6,431,329 B1* | 8/2002 | Huber, Jr. | B60T 13/24 |
| | | | 188/196 D |
| 9,694,803 B2* | 7/2017 | Huber | B60T 17/16 |
| 10,011,257 B2* | 7/2018 | Huber, Jr. | B60T 17/16 |
| 2005/0150730 A1* | 7/2005 | Huber, Jr. | B60T 17/08 |
| | | | 188/153 R |
| 2008/0251327 A1* | 10/2008 | Huber | B60T 17/08 |
| | | | 188/33 |

\* cited by examiner

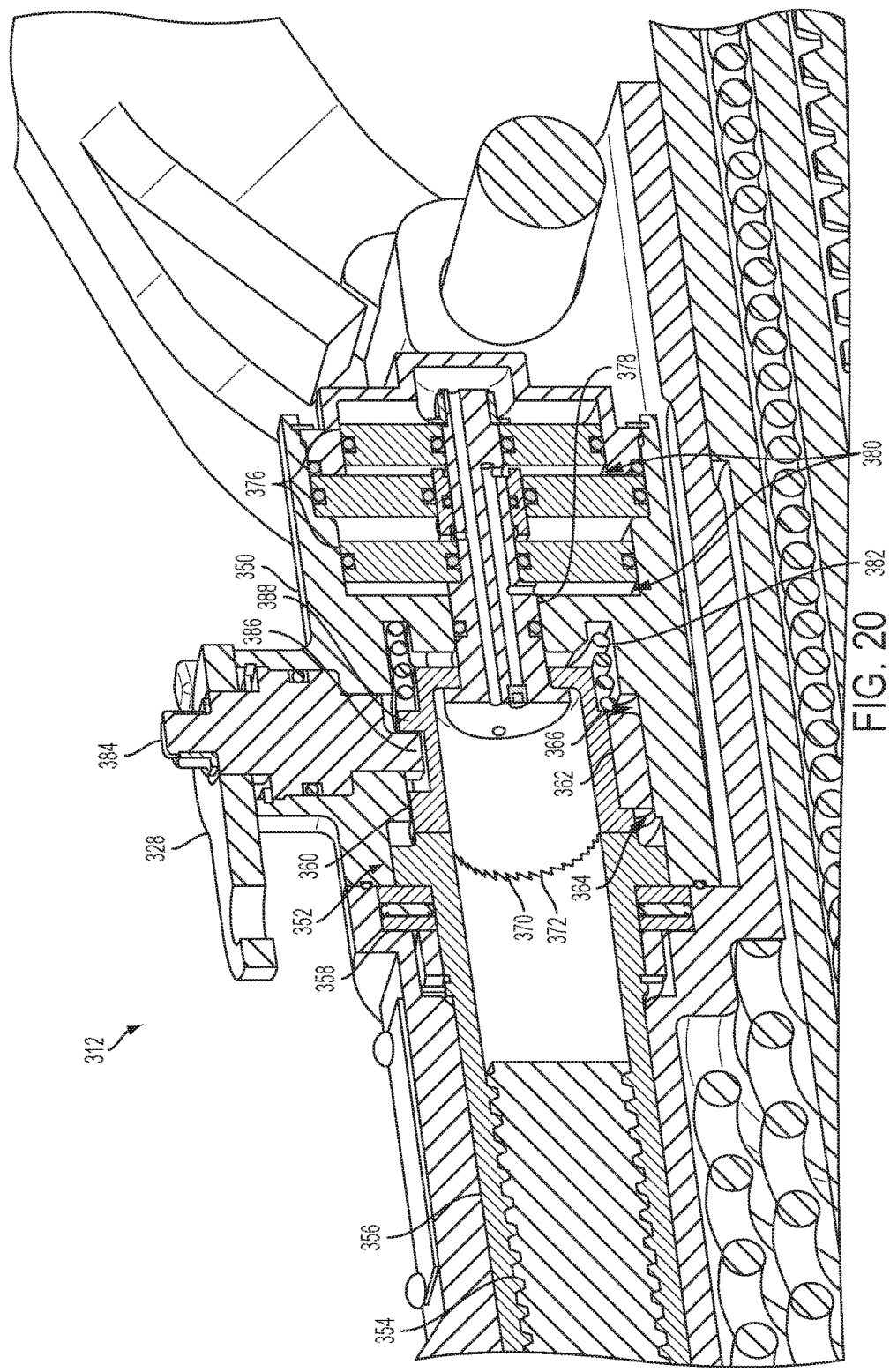

AUTOMATIC PARKING BRAKE FOR TRUCK MOUNTED BRAKE CYLINDER

CROSS-REFERENCE TO RELATED APPLICATIONS

The present application is a divisional of U.S. application Ser. No. 15/788,104, filed on Oct. 19, 2017, which is a continuation of U.S. application Ser. No. 14/679,119, filed on Apr. 6, 2015, which issued as U.S. Pat. No. 9,821,822.

BACKGROUND OF THE INVENTION

1. Field of the Invention

The present invention relates to rail car parking brakes and, more specifically, to an automatic parking brake cylinder for a truck mounted brake cylinder.

2. Description of the Related Art

Most rail vehicles have a manually-operated parking brake that applies the wheel brakes. Unfortunately, this requires that an operator manually apply the brake on each rail car in a train. As a result, an automatic parking brake, such as that disclosed in U.S. Pat. No. 7,163,090, has been developed that will retain the braking system of any rail car equipped with the brake in the brakes applied position if brake pipe pressure is removed from a locking mechanism position about the shaft of the truck mounted brake cylinder. However, due to cylinder design, it is not always possible to position a locking mechanism about the shaft of a truck mounted brake cylinder. According, there is a need for an automatic parking brake that is not coupled to the shaft of the brake cylinder.

BRIEF SUMMARY OF THE INVENTION

The present invention comprises an automatic parking brake for a truck mounted brake cylinder that has a housing having a port for receiving brake pipe pressure. A locking nut is positioned in the housing for rotational movement and a rod extends through the locking nut and is interconnected to a piston of the brake cylinder. The rod is connected to the locking nut via threads so that the locking nut will rotate if the rod moves axially through the locking nut. A locking sleeve is positioned in the housing and moveable between a locked position, where the locking sleeve engages the locking nut and prevents from the nut from rotating, and a released position, where the locking sleeve is disengages from the locking nut and the locking nut is free to rotate. A spring provides a force biasing the locking nut into the locked position, and brake pipe pressure in a chamber in communication with the brake pipe port biases the locking sleeve into the released position when the brake pipe pressure overcomes the bias of the spring. The brake pipe pressure chamber may be coupled to a shoulder of the locking sleeve so that brake pipe pressure applies a biasing force directly to the locking sleeve. Alternatively, the brake pipe pressure chamber may be coupled to a piston that is interconnected to the locking sleeve so that brake pipe pressure applies a biasing force to the piston. The housing of the parking brake may be mounted to a non-pressure head of the brake cylinder with the rod connected directly to the piston. The housing may alternatively mounted to a non-pressure head of the brake cylinder by a trunnion with the rod is connected to the piston via a linkage, such as the existing hand brake lever linkage.

A manual release is interconnected to the locking sleeve and rotatable from a first position, where the locking sleeve is free to engage the locking nut, and a second position where the locking sleeve is moved by the manual release into the released position. The manual release may be interconnected to the hand brake lever so that the manual release rotates from the first to the second position when the hand brake lever is moved from a hand brake released position to a hand brake applied position. For example, the manual release may be interconnected to the hand brake lever via a link having an actuator that contacts a cam associated with the manual release, or by a post having an actuator on one end that contacts a cam associated with the manual release when the hand brake lever impacts an opposing end of the post.

The parking brake may include a second parking brake having the same structure positioned on opposing side of the piston rod of the brake cylinder. In this example, the brake pipe pressure ports may be connected to a single brake pipe pressure inlet. The manual releases may also be interconnected to each other via a common linkage that is response to a single manual input.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 20 is a cross-section of an automatic parking brake coupled to the brake beam and brake lever of a braking system according to the present invention.

DETAILED DESCRIPTION OF THE INVENTION

Figure 1:
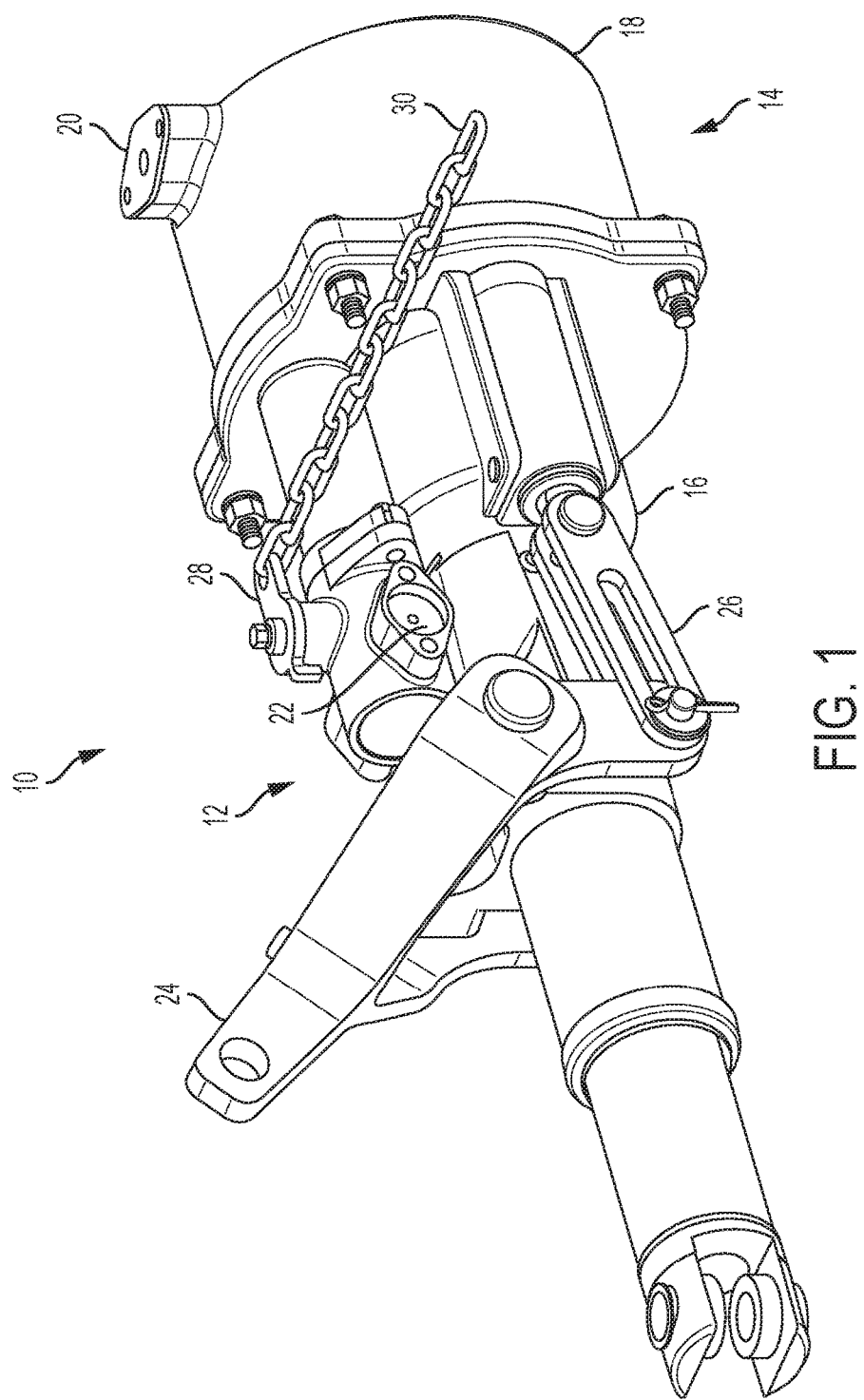
FIG. 1 is a perspective view of an automatic parking brake coupled to a brake cylinder according to the present invention.

Referring now to the drawings, wherein like reference numerals refer to like parts throughout, there is seen in FIG. 1 an automatic parking brake system 10 having a parking brake cylinder 12 internally coupled to a truck mounted brake cylinder 14. Brake cylinder 14 generally comprises a non-pressure head 16 mounted to a pressure cylinder 18 having an inlet port 20 for receiving and venting the air pressure from a source of brake cylinder pressure. Parking brake cylinder 12 is mounted to non-pressure head 16 and includes a brake pipe port 22 for receiving and venting air pressure from a source of brake pipe pressure. Brake cylinder 14 further comprises a mechanical parking brake lever 24 that is interconnected to non-pressure head 16 via a slotted link 26. Parking brake cylinder 12 includes a manual release 28 that allows for manual disengagement of parking brake cylinder 22 via a chain 30.

Figure 2:
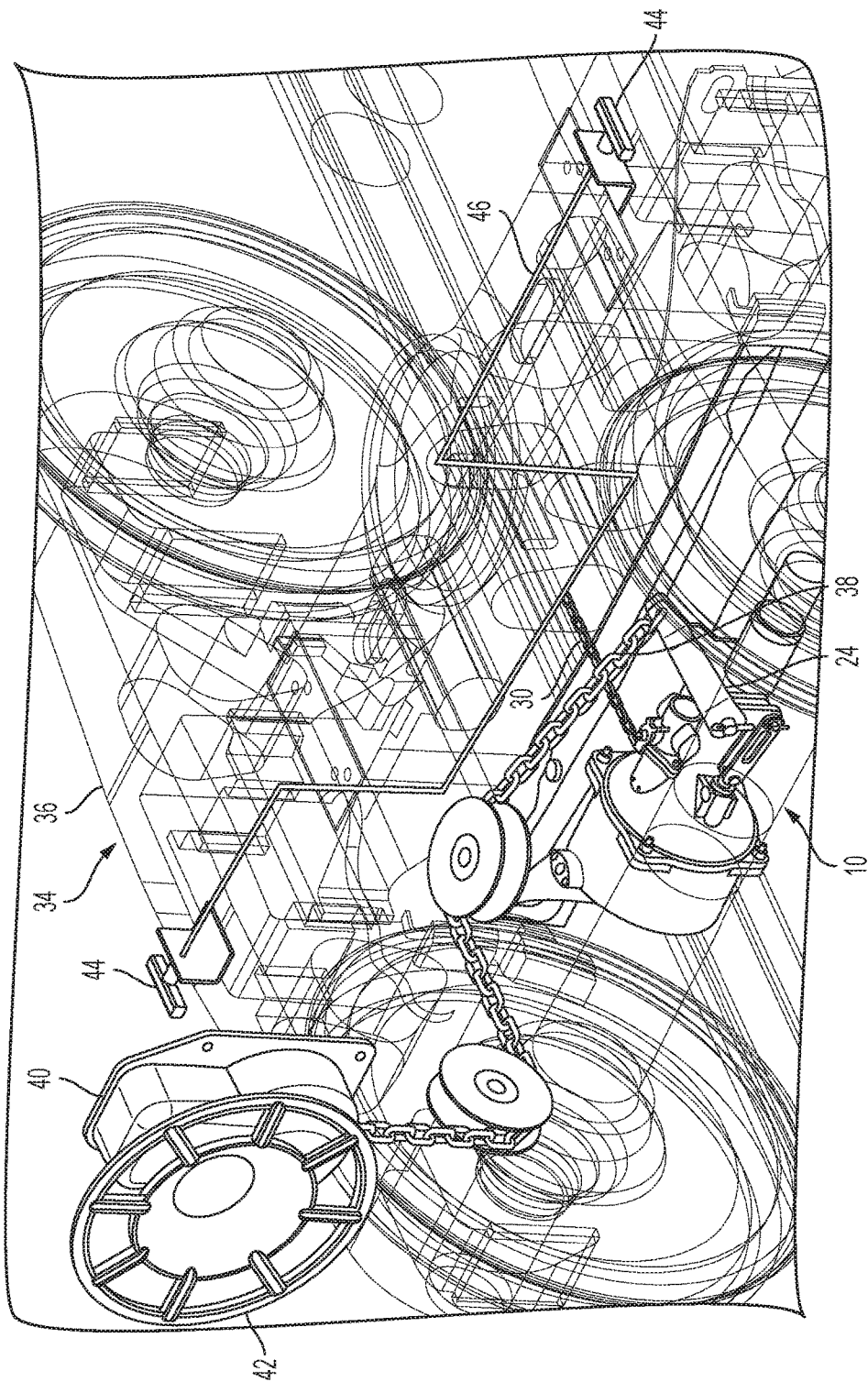
FIG. 2 is schematic of an automatic parking brake and brake cylinder coupled to a rail car braking system according to the present invention.

Referring to FIG. 2, automatic parking brake system 10 is incorporated into a rail car braking system 34 by mounting brake cylinder 14 to a rail car truck 36 in the conventional manner. Hand brake lever 24 is interconnected by a chain 38 to a hand brake 40 having a user operable wheel 42 for manually taking up chain 38 and moving hand brake lever 24 to manually apply the rail car brakes. One or more manual release handles 44 are coupled via a cable 46 to chain 30 of manual release 28. Alternatively, a hydraulic cylinder may be used in lieu of hand brake 40 to hydraulically take up chain 38 and may include a slow bleed to relieve the pressure used to apply the brakes.

Figure 3:
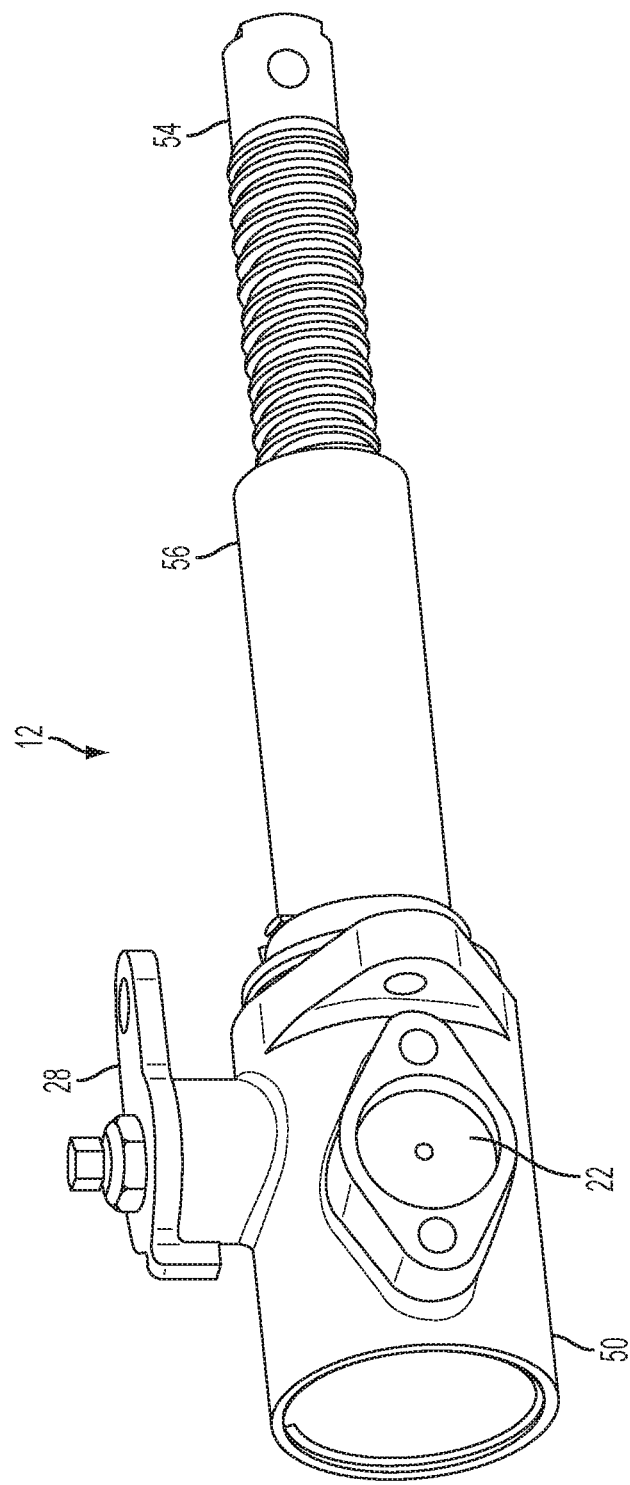
FIG. 3 is a perspective view of an automatic parking brake according to the present invention.
Figure 4:
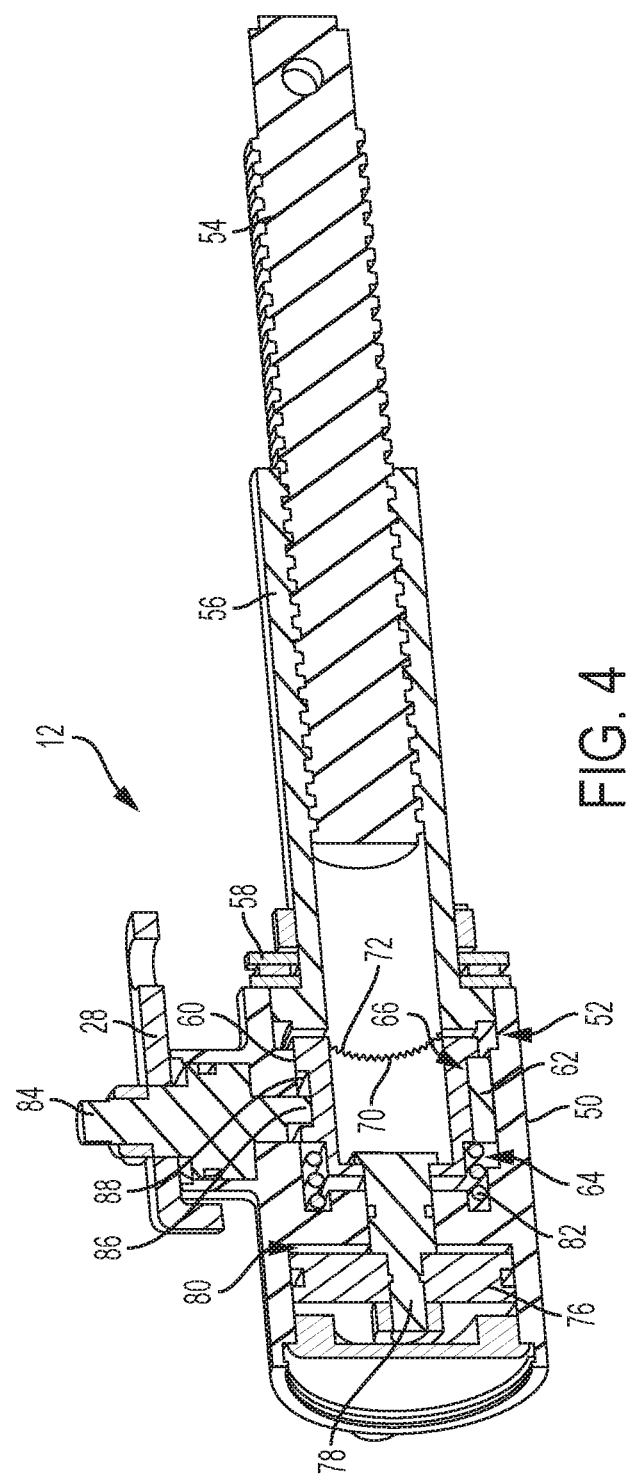
FIG. 4 is a cross-section an automatic parking brake according to the present invention.

As seen in FIGS. 3 and 4, parking brake cylinder 12 comprises a housing 50 that is mounted to non-pressure head 16 and supports brake pipe port 22. Housing 50 encloses a locking mechanism 52 that is responsive to air pressure supplied to brake pipe port 22 to selectively permit a telescoping of control rod 54. Locking mechanism 52 includes a locking nut 56 that is held within housing 50 by a thrust bearing 58 and coupled to rod 54 by corresponding high helix threads so that locking nut 56 will rotate if rod 54 translates through locking nut 56. Locking mechanism 52 further comprises a locking sleeve 60 positioned in housing 50 for axial, but not rotational, movement. For example, sleeve 60 may be held within housing 50 by one or more pins 62 seated in grooves 64 and 66 in sleeve 60 and housing 50, respectively, so that sleeve 60 cannot rotate but can slide axially within housing 50. Locking sleeve 60 may move axially within housing 50 from a first position, where locking sleeve 60 is disengaged from locking nut 56 and a second position, wherein locking sleeve 60 is engaged with locking nut 56. As seen in FIG. 1, the leading edge of locking sleeve 60 includes teeth 70 that engage with corresponding teeth 72 on the trailing edge of locking nut. As a result, when locking sleeve 60 is engaged with locking nut 56, locking sleeve 60 will prevent locking nut 56 from rotating. Similarly, when locking sleeve 60 is disengaged from locking nut 56, locking nut 56 is free to rotate. Thus, movement of locking sleeve 60 controls whether rod 54 is free to translate axially within locking nut 56. One set of teeth 70 or 72 may be ratcheted so that nut 56 can only rotate in one direction when engaged with locking sleeve, i.e., rod 54 is free to telescope in one direction but not the other. Locking sleeve 60 is coupled to a piston 76 by a connecting stem 78. Piston 76 is positioned on the other side of a brake pipe pressure chamber 80 in fluid communication with brake pipe port 22 so that pressure in chamber 80 will move sleeve 60 axially from the engaged position to the disengaged position. A spring 82 in housing 50 biases locking sleeve 60 into the engaged position in the absence of sufficient brake pipe pressure in chamber 80. Locking sleeve 60 is also coupled to a manual release stem 84 that extends out of housing 50 to form manual release 28. Stem 84 includes an eccentric post 86 that, when rotated, engages a shoulder 88 on sleeve 60 to move locking sleeve 60 out of engagement with locking nut 56 against the bias of spring 82.

Figure 5:
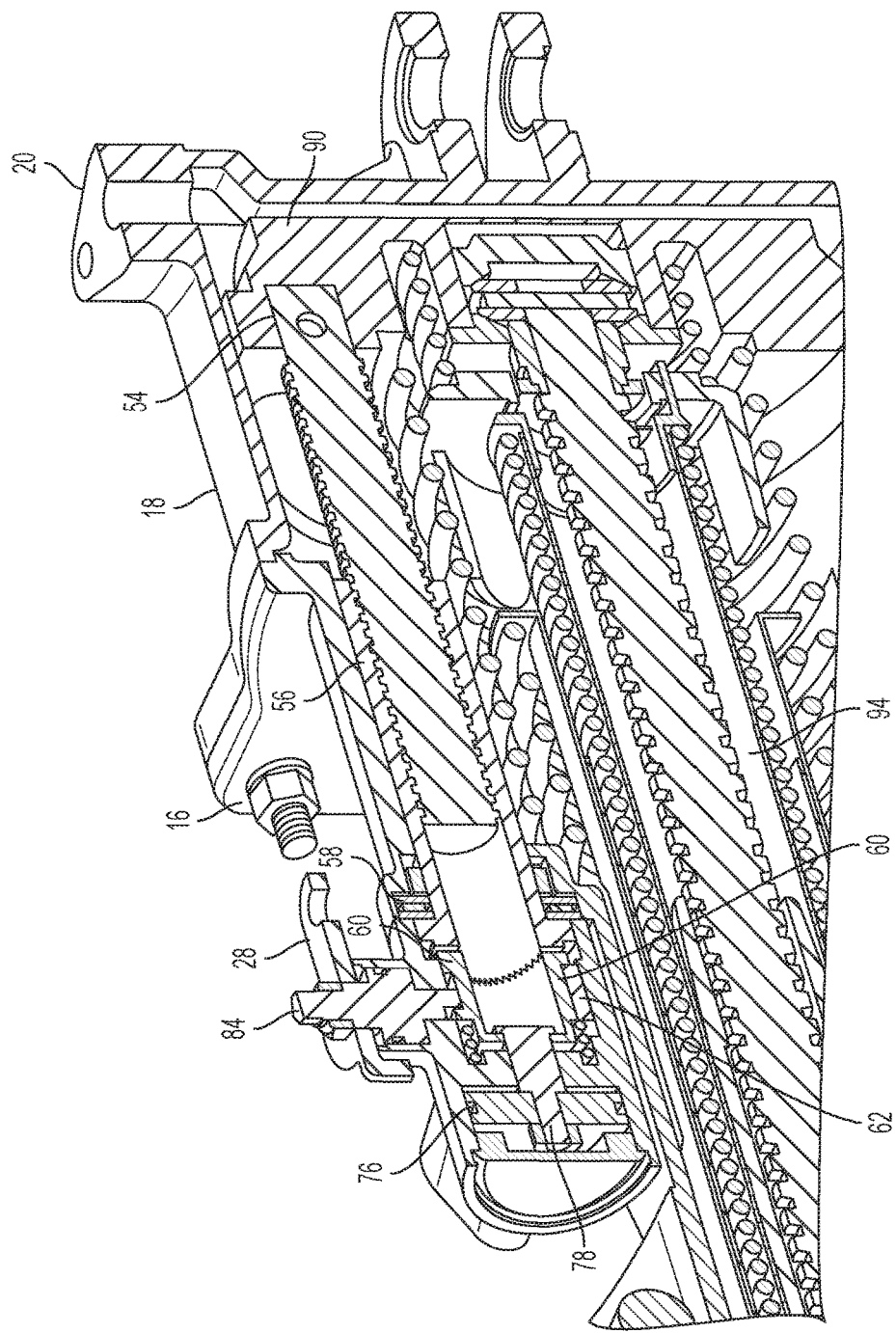
FIG. 5 is a partial cross-section of an automatic parking brake coupled to a brake cylinder according to the present invention.

Referring to FIG. 5, rod 54 of parking brake cylinder 12 extends through non-pressure head 16 of brake cylinder 14 into pressure cylinder 18 and is secured to one side of the brake cylinder piston 90 in pressure cylinder 18. Piston 90 transmits the pressure associated with a source of brake cylinder pressure supplied to inlet 20 to the braking system via a push rod 94. When brake pipe pressure is removed from parking brake cylinder 12, locking sleeve 60 will engage locking nut 56 under the bias of spring 82 so that rod 54 is fixedly secured from translating through locking nut 56. Parking brake cylinder 12 will thus prevent brake cylinder piston 90 from returning push rod 94 into a brakes released position, and thus the rail car braking system, even if brake cylinder pressure is exhausted from inlet port 20. When a threshold amount of brake pipe pressure is supplied to chamber 80, locking sleeve 60 will be forced out of engagement with locking nut 56 (against the bias of spring 82) so that rod 54 is free to move and brake cylinder piston 90 can return to the brakes released position.

Figure 6:
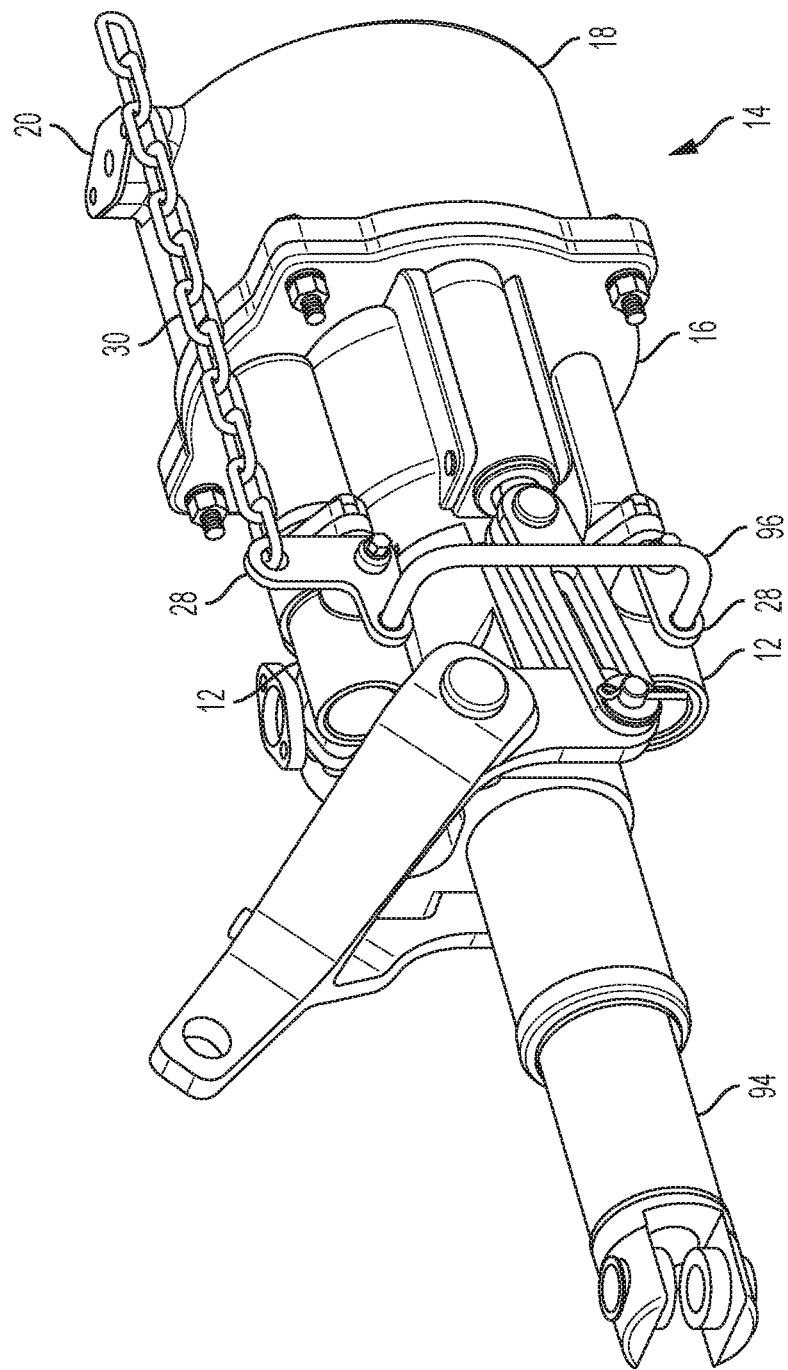
FIG. 6 is a perspective view of a pair of automatic parking brakes coupled to a brake cylinder according to the present invention.
Figure 7:
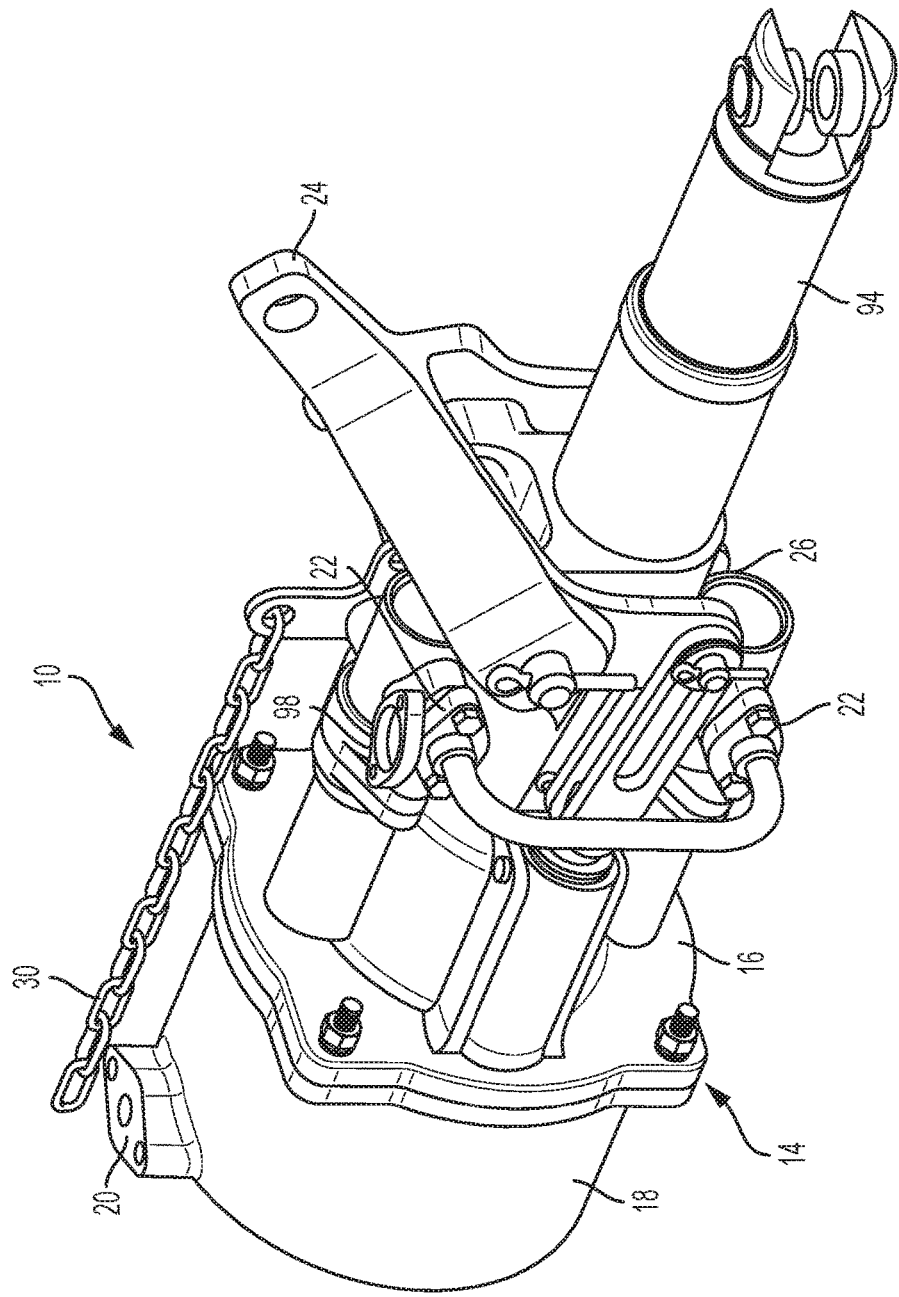
FIG. 7 is a perspective view of a pair of automatic parking brakes coupled to a brake cylinder according to the present invention.
Figure 8:
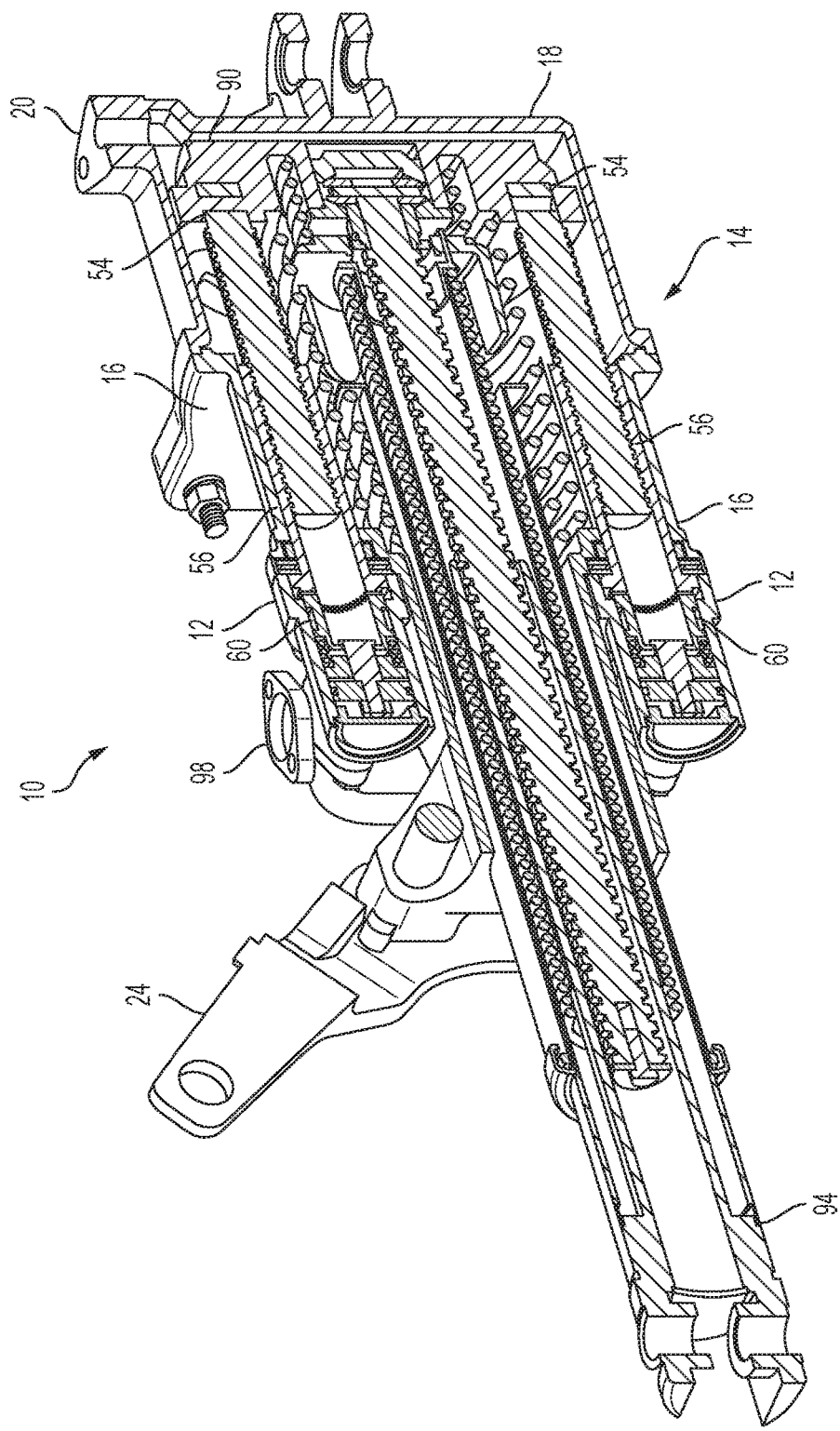
FIG. 8 is a cross-section of a pair of automatic parking brakes coupled to a brake cylinder according to the present invention.
Figure 9:
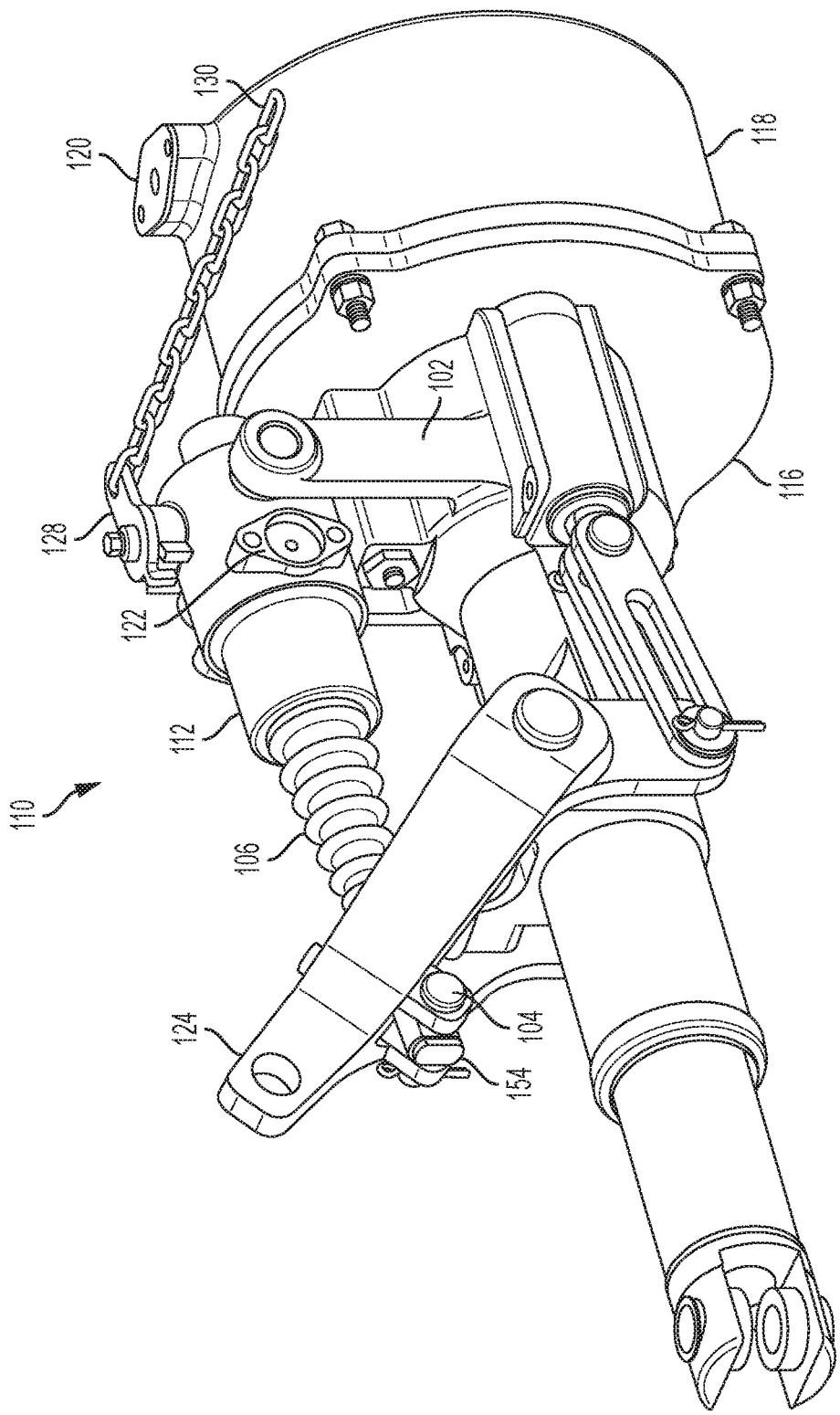
FIG. 9 is a perspective view of another automatic parking brake coupled to a brake cylinder according to the present invention.

Referring to FIGS. 6-8, two or more parking brake cylinders 12 may be coupled to brake cylinder 14 if they are oriented symmetrically about the centerline of the push rod 54 of brake cylinder 14 to prevent piston 90 from tipping when under load. To accommodate multiple parking brake cylinders 12, the manual releases 28 associated with both parking brake cylinders 14 are interlinked via a connector 96 so that an operation of a manual release handle by a user will be communicated via chain 30 to both manual releases 28 simultaneously. As seen in FIG. 7, brake pipe ports 22 of both parking brake cylinders 12 may also be interconnected so that a single inlet 98 may be used to connect both parking brake cylinders 12 to a source of brake pipe pressure. As seen in FIG. 8, rods 54 of parking brake cylinders 12 are interconnected to brake cylinder piston 90 on opposing sides of piston rod 54 to balance the forces on piston 90.

Figure 10:
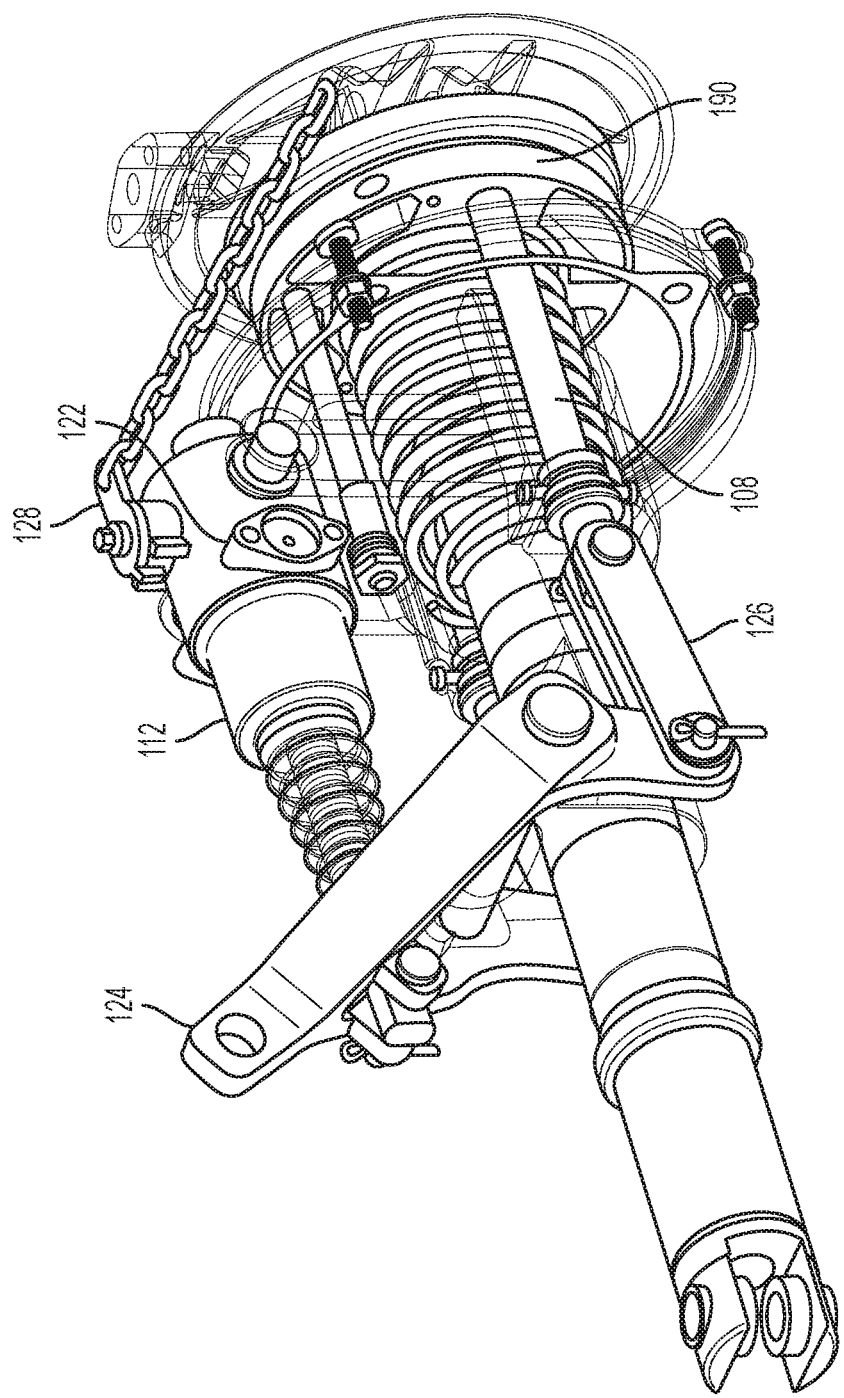
FIG. 10 is a perspective view of an automatic parking brake coupled to a brake cylinder according to the present invention.

Referring to FIGS. 9-13, an automatic parking brake system 110 may have an externally coupled parking brake cylinder 112 that is pivotally mounted via a trunnion 102 to non-pressure head 116 of brake cylinder 114. Instead of connecting directly to the brake cylinder piston of brake cylinder 114, rod 154 of parking brake cylinder 112 is coupled to mechanical parking brake lever 124 via a pivotal connection 104 and covered by a boot 106. As seen in FIG. 10, mechanical parking brake lever 124 is connected to brake cylinder piston 190 via links 126 on the outside of non-pressure head 116 that are coupled to control rods 108 that extend into pressure cylinder 118 and are directly secured to piston 190. Parking brake cylinder 112 thus locks piston 190 from releasing the brakes by preventing hand brake lever 124 from pivoting and thus prevents piston 190 from moving to a brakes released position as control 108 cannot move if parking brake lever 124 is unable to move.

Figure 11:
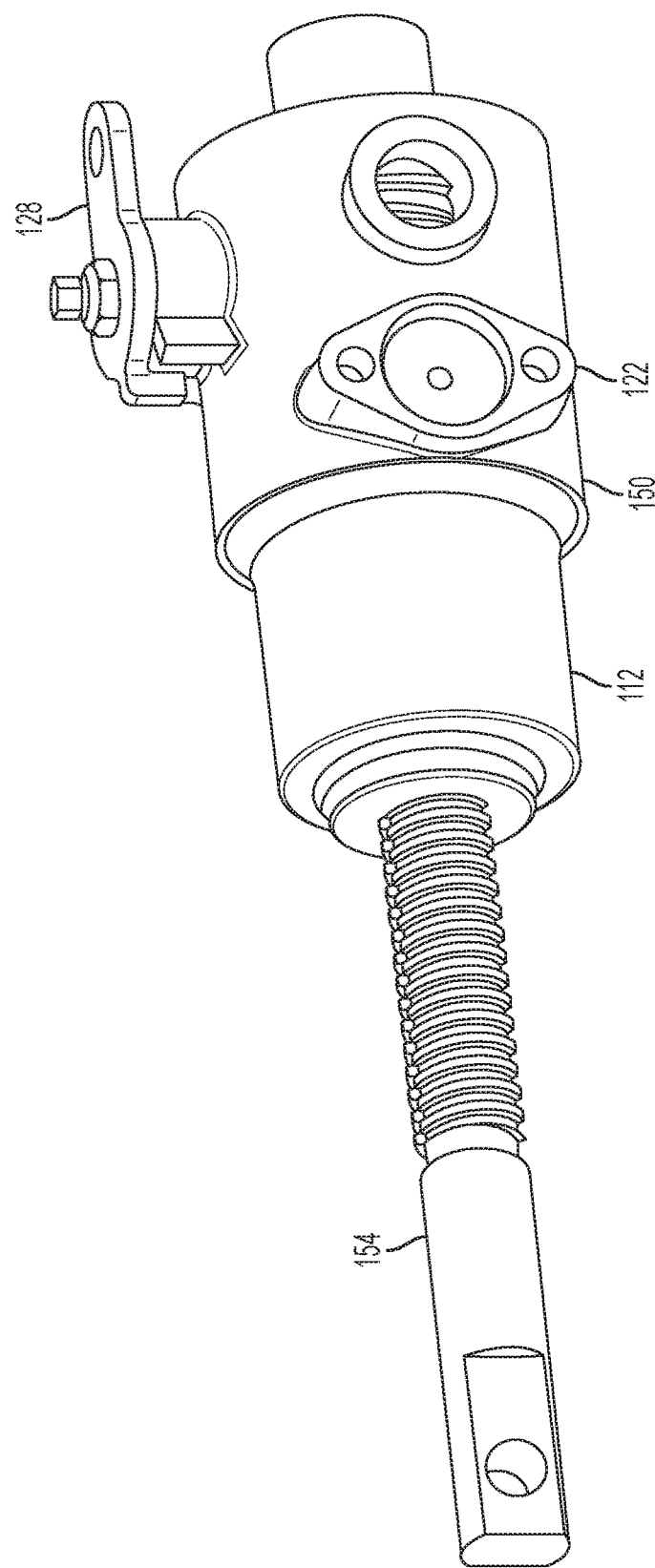
FIG. 11 is a perspective view of an automatic parking brake according to the present invention.
Figure 12:
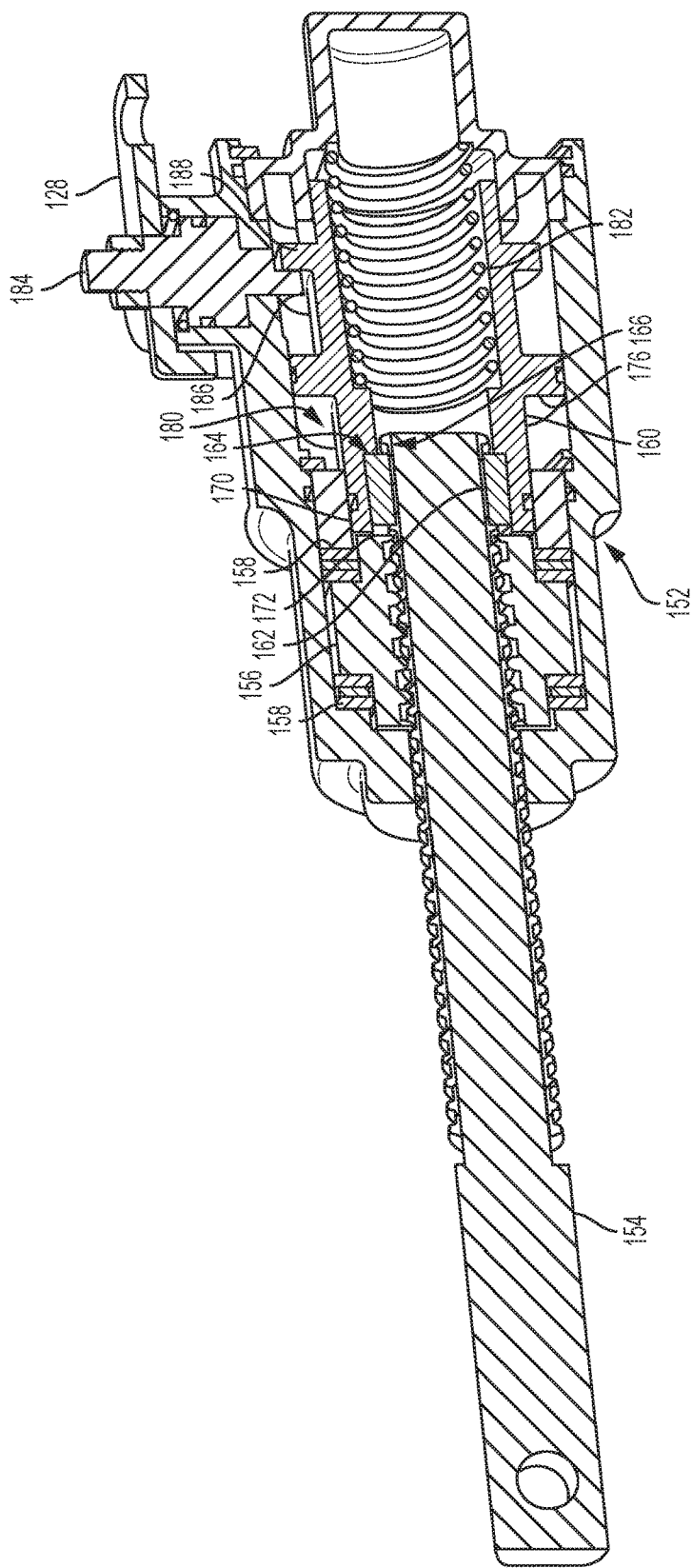
FIG. 12 is a cross-section of an automatic parking brake coupled to a brake cylinder according to the present invention.

Referring to FIGS. 11 and 12, externally coupled parking brake cylinder 112 comprises a housing 150 having a brake pipe port 122 and enclosing a locking mechanism 152 that is responsive to air pressure supplied to brake pipe port 122. Locking mechanism 152 includes a locking nut 156 that is held within housing 150 by a pair of thrust bearings 158 and is capable of rotating within housing 150. Locking nut 156 is coupled to a rod 154 via corresponding high helix threads so that movement of rod 154 within locking nut 156 will cause locking nut 156 to rotate. Locking mechanism 152 further comprising a locking sleeve 160 in housing 150 that cannot rotate due to a pair of pins 162 positioned in corresponding grooves 164 and 166 formed in locking sleeve 160 and rod 154, respectively. Locking sleeve 160 is free to move axially within housing 150 from a first position, where locking sleeve 160 is disengaged from locking nut 156 and a second position, wherein locking sleeve 160 is engaged with locking nut 156. The leading edge of locking sleeve 160 includes teeth 170 that engage with corresponding teeth 162 on the trailing edge of locking nut 156. As a result, when locking sleeve 160 is engaged with locking nut 156, locking sleeve 160 will prevent locking nut 156 from rotating. Similarly, when locking sleeve 160 is disengaged from locking nut 156, locking nut 156 is free to rotate. Thus, movement of locking sleeve 160 controls whether rod 154 is free to translate axially within locking nut 156. A pressure chamber 180 in fluid communication with brake pipe port 122 is positioned adjacently to shoulder 176 of locking sleeve 160 so that the introduction of brake pipe pressure into chamber 180 will move locking sleeve 160 axially within housing so that locking sleeve 160 is disengaged from locking nut 156. Locking sleeve 160 is also coupled to a manual release stem 184 having an eccentric post 186 that, when rotated, will apply a force to a second shoulder 188 of locking sleeve 160 to move locking sleeve 160 axially out of engagement with locking nut 156. A spring 182 in housing 150 biases locking sleeve 160 into the engaged position.

Figure 13:
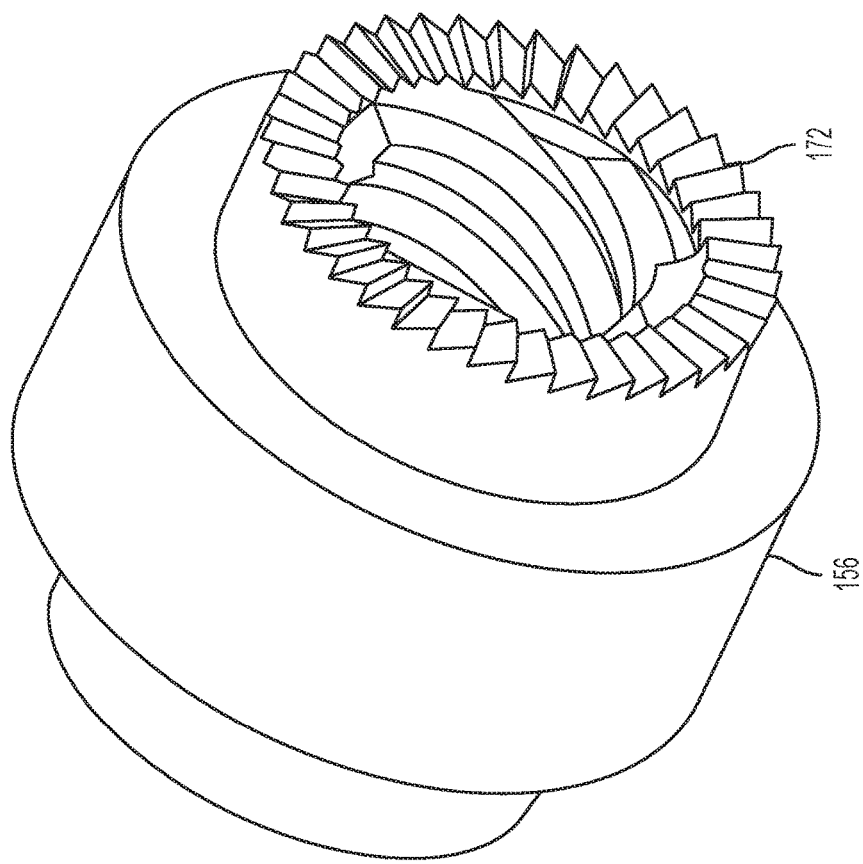
FIG. 13 is a perspective view of ratcheted locking nut according to the present invention.

As seen in FIG. 13, teeth 172 of locking nut 156 may be ramped to allow for ratcheting in one direction, thereby allowing rod 154 to translate through locking nut in one direction, but not the other. As a result of the ratcheting, brake cylinder piston 190 can move into the brakes applied position even if locking sleeve 160 is engaged with locking nut 156, but rod 154 cannot move in the opposition direction so any brake application by piston 190 will be retained into the brakes applied position. When brake pipe pressure is removed from parking brake cylinder 112, locking sleeve 160 will engage locking nut 156 under the bias of spring 182 so that rod 154 is fixedly secured from translating through locking nut 156. Parking brake cylinder 112 will thus prevent brake cylinder piston 190 from returning the braking system to the brakes released position even if brake cylinder pressure is exhausted from inlet port 120. When a threshold amount of brake pipe pressure is supplied to chamber 180, locking sleeve 160 will be forced out of engagement with locking nut 156 against the bias of spring 182 so that rod 154 is free to move and brake cylinder piston 190 can return to the brakes released position.

Figure 14:
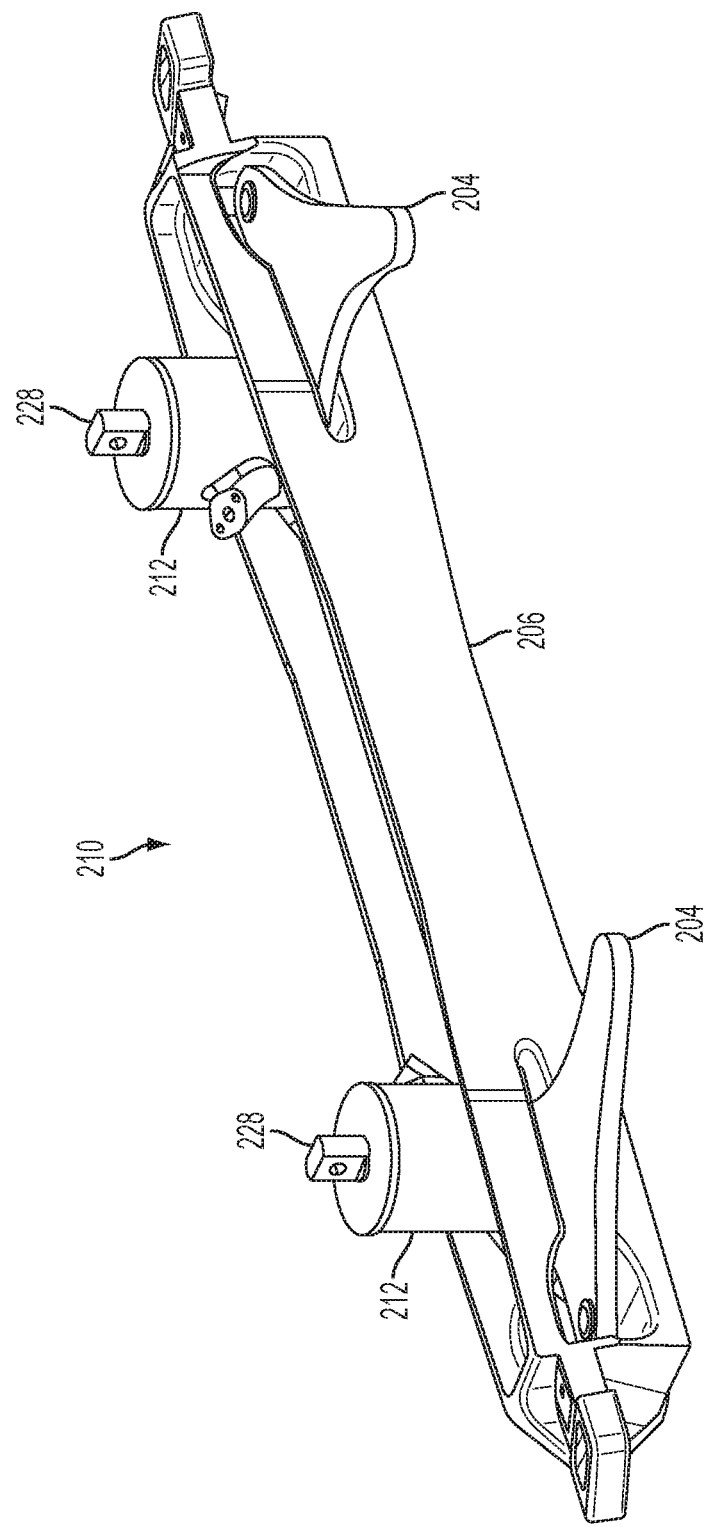
FIG. 14 is a perspective view of an automatic parking brake coupled to the brake beam and brake lever of a braking system according to the present invention.
Figure 15:
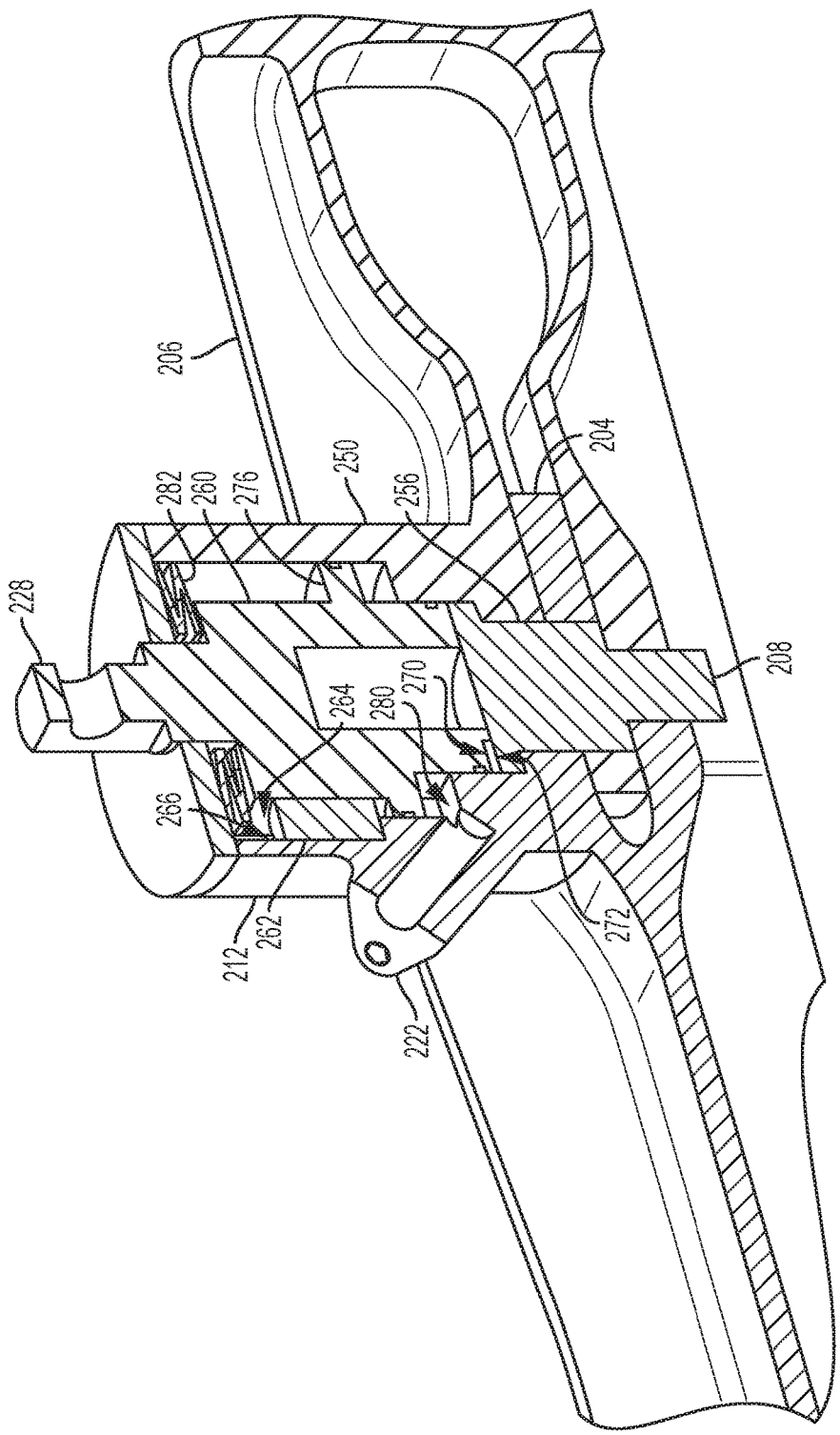
FIG. 15 is a cross-section of an automatic parking brake coupled to the brake beam and brake lever of a braking system according to the present invention.

Referring to FIG. 14 an automatic parking brake system 210 may comprise one or more parking brake cylinders 212 coupled to the brake levers 204 and brake beam 206 of a rail car braking system. As seen in FIG. 15, parking brake cylinder 212 comprises a housing 250 mounted to or integrally formed with brake beam 206. A locking nut 256 is positioned in housing 250 and includes a post 208 that extends from housing 250. Post 208 is fixedly secured to brake lever 204 so that post 208 and lever 204 rotate as a single unit. Locking nut 256 and brake lever 204 will thus rotate as a single unit as brake lever 204 rotates during braking operations. A locking sleeve 260 positioned in housing 250 is capable of moving from a first position, where locking sleeve 260 is disengage from locking nut 256, to a second position, where locking sleeve 260 engages locking nut 256. Locking sleeve 260 cannot rotate within housing 250 due to one or more pins 262 positioned within corresponding grooves 264 and 266 formed in locking sleeve 260 and the interior surface of housing 250, respectively. The leading edge of locking nut 256 includes a set of teeth 272 that interlock with a corresponding set of teeth 272 on locking sleeve 260. As described above, one set of teeth 270 or 272 are preferably ratcheted to allow locking nut 256 to rotate in one direction, but not the other, so that lever 204 can move in one direction, but not the other, when locking nut 256 and locking sleeve 260 are engaged. A brake pipe pressure chamber 280 in communication with a brake pipe pressure port 222 is formed in housing 250 and positioned adjacently to a shoulder 276 of locking sleeve 260 so that pressure in chamber 280 will cause sleeve 260 to move axially away from locking nut 256. A spring 282 positioned in housing 250 biases sleeve 260 toward locking nut 256 when the pressure in chamber 280 falls below a predetermined threshold. A manual release 228 at one end of housing 250 allows for manually disengagement of locking sleeve 260 and locking nut 256 by allowing sleeve 260 to be moved axially against the bias of spring 282 even in the absence of brake pipe pressure in brake pipe pressure chamber 280.

Prior to a service brake or emergency brake operation, brake cylinder pressure will nominally zero and the brake pipe pressure will be between 60 and 110 psig. Because of the brake pipe pressure, the locking mechanism of any parking brake cylinder described above will be disengaged. When the service brake or emergency brake is applied, the brake cylinder will apply the brakes and the parking brake cylinder will remain disengaged because the brake pipe pressure remains between 60 and 110 psig. If a parking brake operation is not desired, the service brake or emergency brake may be stopped by removing brake cylinder pressure, thus allowing the brake cylinder to return to the brakes released position as locking mechanism remains disengaged. If a parking brake operation is desired, brake pipe pressure is removed prior to removing brake cylinder pressure. The removal of brake pipe pressure allows any locking sleeve described above to move into engagement with the locking nut. If brake cylinder pressure is subsequently removed, the braking system will not return to the brakes released position because locking mechanism has engaged and parking brake cylinder prevents the brake cylinder piston or brake lever from moving back to a brakes released position. A subsequent application of brake pipe pressure will disengage the locking sleeve and locking nut, thereby releasing the parking brake so that the brakes may return to the released position. Alternatively, the parking brake may be manually released by using any of the manual release connections discussed above. Notably, the manual release may not be manually undone as only a brake application and the removal of brake pipe pressure can reset the locking mechanism of parking brake cylinder. If locking mechanism is engaged due to the absence of brake pipe pressure, but the brakes are in the released position, the brakes may be still put into the applied position by an application of brake cylinder pressure because the ratcheted connection between the locking nut and the locking sleeve will allow the brake cylinder to be pressurized and move from the brakes released position to brakes applied (but not from brakes applied to brakes released). Table 1 below identifies the state of the relevant components during the various operational states of the braking system.

TABLE 1

| State | Brake Pipe Pressure | Brake Cylinder Pressure | Mechanical Lock |
|---|---|---|---|
| Release | >60 Psig | 0 | Unlocked |
| Service Brake | >60 Psig | Service | Unlocked |
| Emergency | 0 | Emergency | Locked |
| Emergency | 0 | Leaks To Zero | Locked |
| Release | >60 Psig | 0 | Unlocked |

Figure 16:
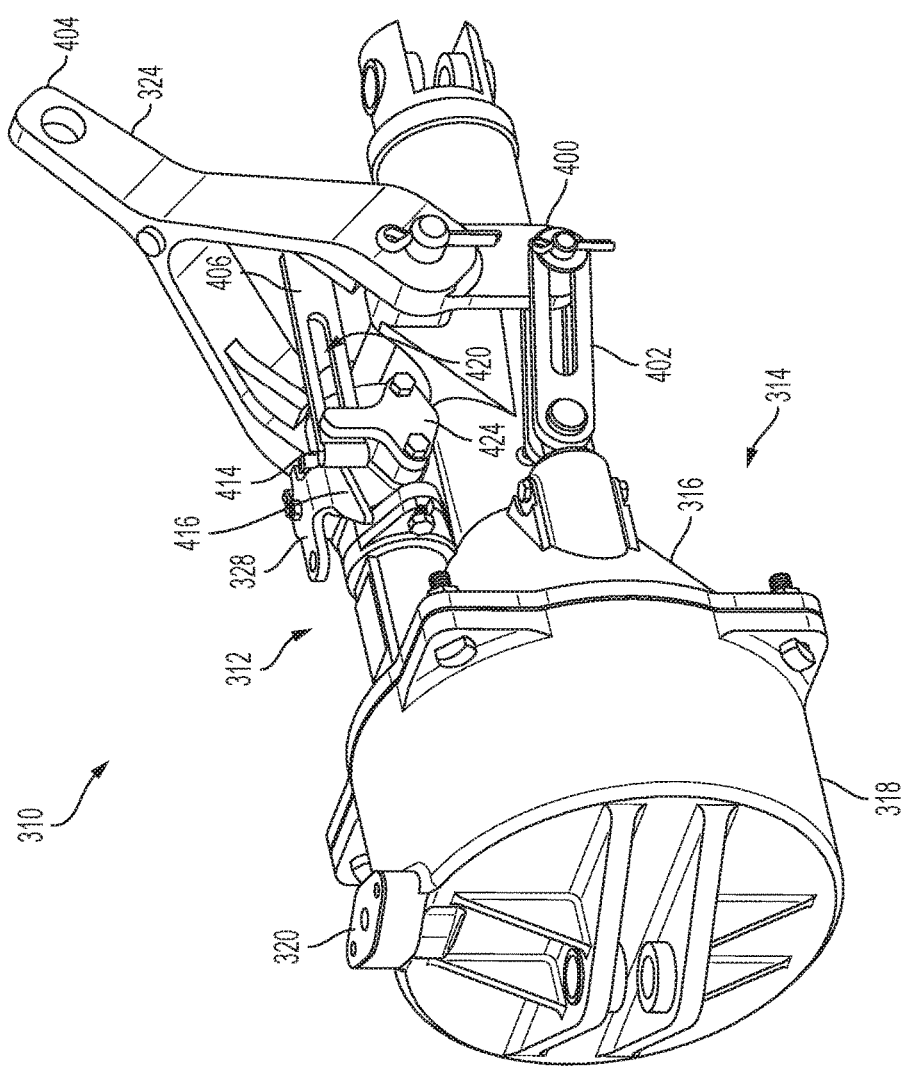
FIG. 16 is a perspective view of an automatic parking brake coupled to the brake beam and brake lever of a braking system according to the present invention.
Figure 17:
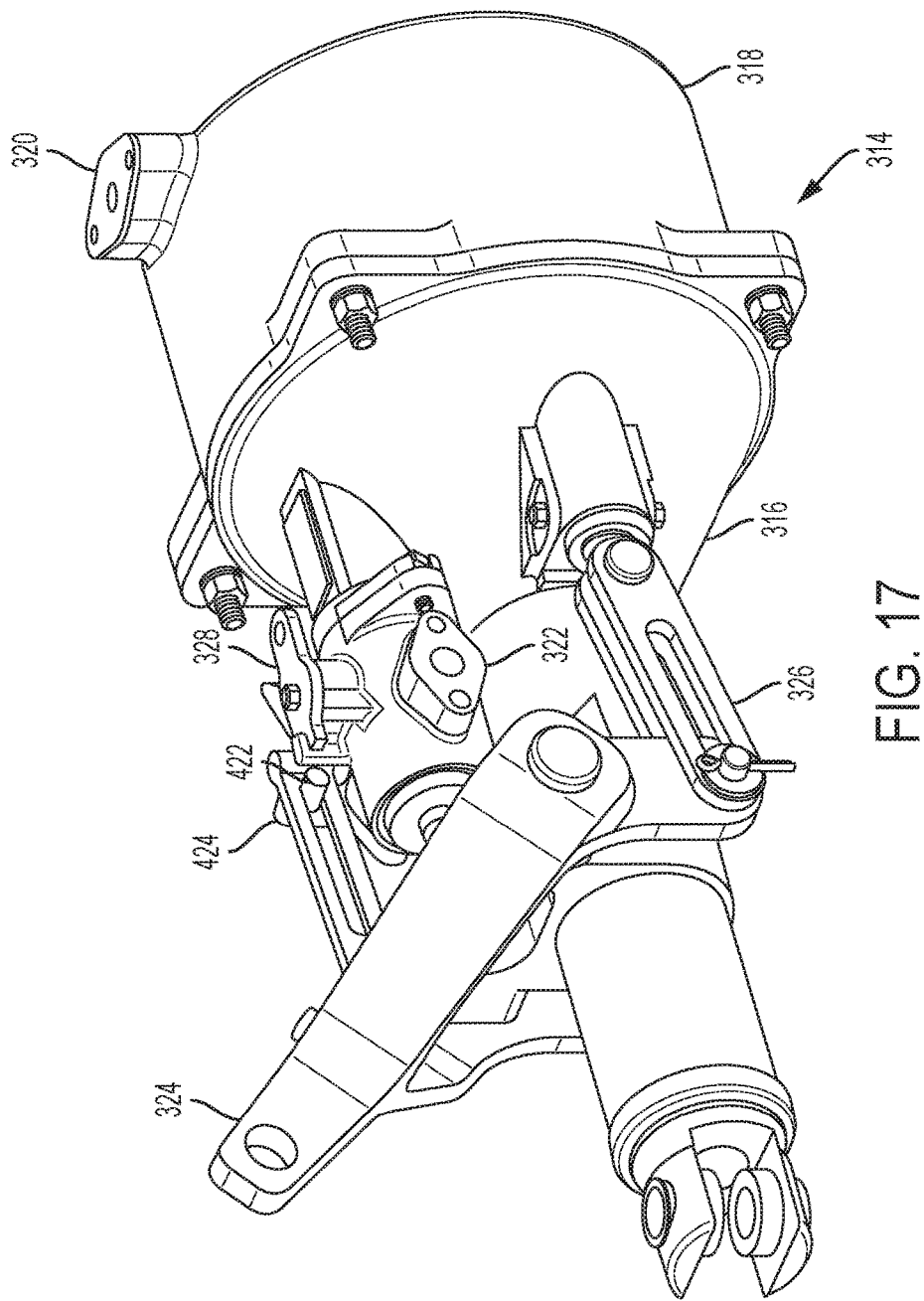
FIG. 17 is a perspective view of an automatic parking brake coupled to the brake beam and brake lever of a braking system according to the present invention.

Referring to FIGS. 16-17, an automatic parking brake system 310 may be configured to avoid undesirable high loading on a parking brake cylinder 312 and the pressure needed to release parking brake cylinder 312 if hand brake forces are added via mechanical parking brake lever 324. Mechanical parking brake lever 324 is pivotally mounted to non-pressure head 316 of brake cylinder 314 and coupled at one end 400 to brake cylinder piston inside pressure cylinder 318 via a pair of slotted links 402 on opposing sides of non-pressure head 316. As previously seen in FIG. 2 with respect to hand brake lever 24, the opposing end 404 of lever 324 may also be interconnected to a conventional hand brake 40, such as by a chain 38, that when taken up by hand brake, will pull the upper end of lever 324 toward the pressure cylinder 318 of brake cylinder 314 and mechanically apply the brakes by pulling on piston rods attached to the piston of brake cylinder 314. Mechanical parking brake lever 324 can thus move the braking system into the brakes applied position in the absence of any brake cylinder pressure if a hand brake 40 is used to tension chain 38 and move hand brake lever 324. Hand brake lever 324 is also interconnected at an intermediate point to manual release 328 via a parking brake link 406. One end of parking brake link 406 is pivotally attached to hand brake lever 324. The opposing end of parking brake link 406 includes an actuator 414 that is positioned proximately to a cam 416 that is associated with manual release 328 and capable of rotating manual release 328 if contacted. Parking brake link 406 include a slot 420 formed therethrough that is captured by a post 422 extending from a bracket 424 mounted to one side of parking brake cylinder 312. Bracket 424 and post 422 support link 406 in proximity to cam 416 and allow link 406 to translate from a first position, where actuator 414 is spaced apart from or not applying a force to cam 416, into a second position, where actuator 414 has contacted and applied a force to cam 416 such that manual release 328 is rotated. Thus, when hand brake lever is moved 324, link 406 pushes cam 416 to rotate manual release stem 328, thereby disengaging locking mechanism 352 of parking brake cylinder 312.

Figure 18:
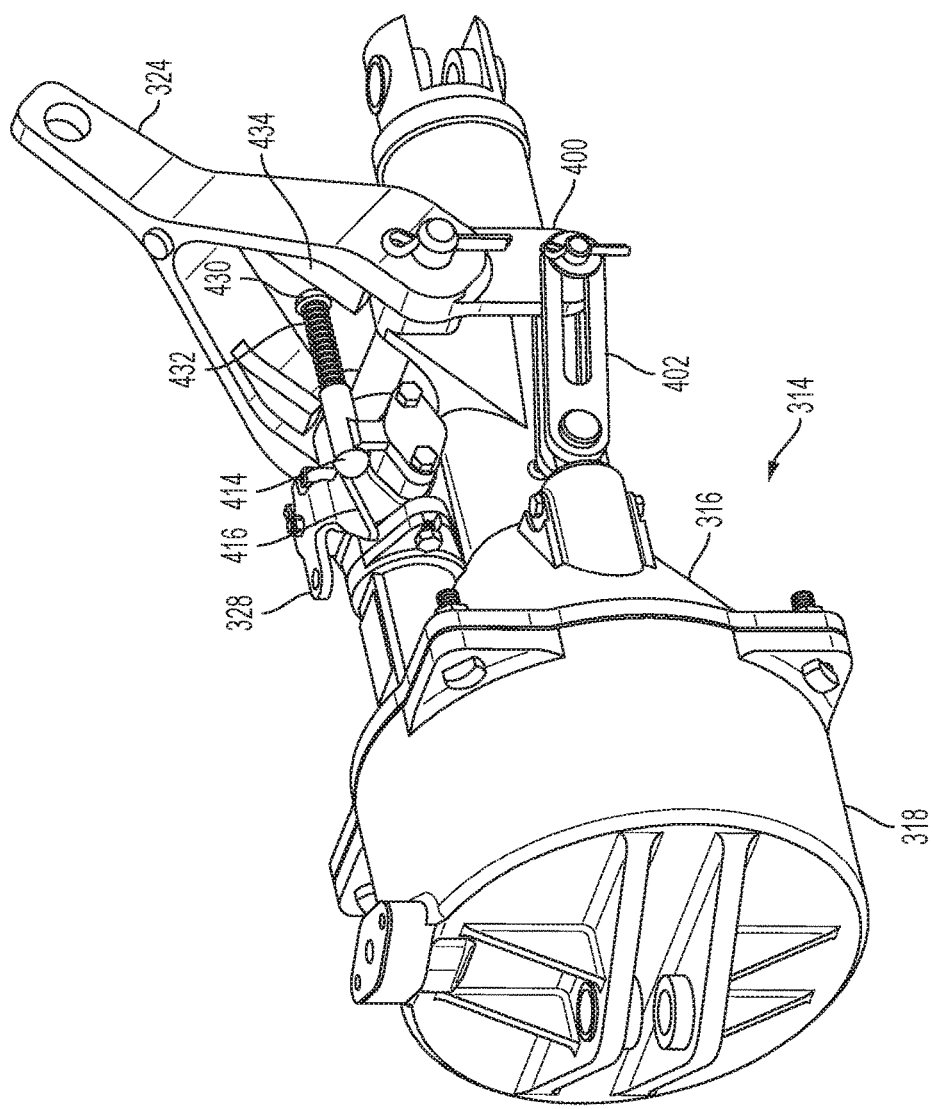
FIG. 18 is a perspective view of an automatic parking brake coupled to the brake beam and brake lever of a braking system according to the present invention.
Figure 19:
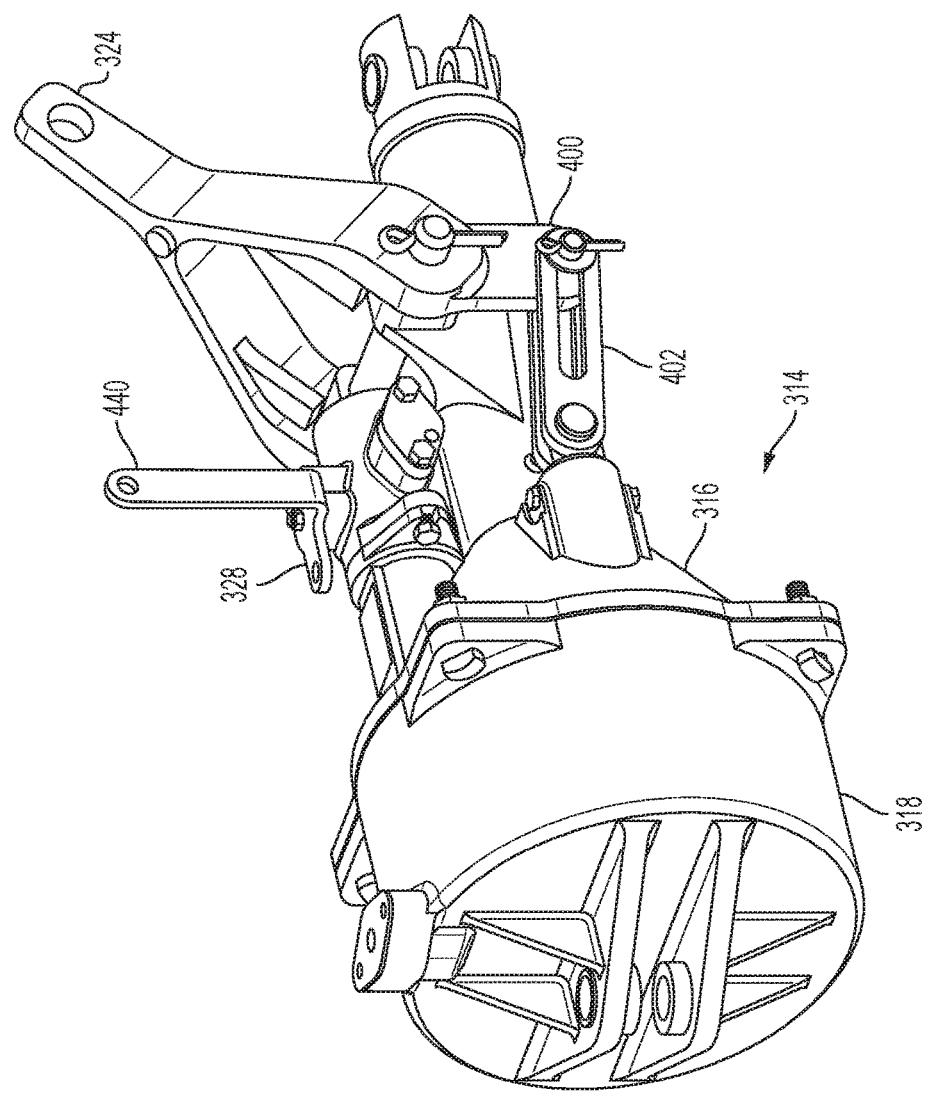
FIG. 19 is a perspective view of an automatic parking brake coupled to the brake beam and brake lever of a braking system according to the present invention.

As seen in FIG. 18, hand brake lever 324 could also contact and move cam 416 via a push rod 430 that is contacted by a shoulder 434 on hand brake lever 324. Push rod 430 is biased by a spring 432 so that push rod 430 will move out of engagement with cam 416 if hand brake lever 324 moves to the released position. Alternatively, as seen in FIG. 19, manual release 328 could include a parking brake chain lever 440 that is interconnected to chain 38 via a spring so that when lever 440 is moved and manual release 328 is rotated when chain 38 is taken up by a hand brake 40.

Referring to FIG. 20, parking brake cylinder 312 comprises a housing 350 that is mounted to non-pressure head 316 and, internally of pressure cylinder 318, to brake piston 390 and includes a brake pipe port 322. Housing 350 encloses a locking mechanism 352 that is responsive to air pressure supplied to brake pipe port 322 to selectively permit a control rod 354 to telescope into and out of control nut 356. As in prior examples, rod 354 is mechanically connected to the piston of brake cylinder 314 and thus rod 354 moves in combination with the piston. Locking mechanism 352 includes a locking nut 356 that is held within housing 350 by a thrust bearing 358 and coupled to rod 354 by corresponding high helix threads to that nut 356 will rotate if rod 354 translates through nut 356. Locking mechanism 352 further comprises a locking sleeve 360 positioned in housing 350 for axial, but not rotational, movement. For example, sleeve 360 may be held within housing 350 by one or more pins 362 seated in grooves 364 and 366 formed in sleeve 360 and housing 350, respectively, so that sleeve 360 cannot rotate but can move axially within housing 350. Locking sleeve 360 may move axially within housing 350 from a first position, where locking sleeve 360 is disengaged from locking nut 356 and a second position, wherein locking sleeve 360 is engaged with locking nut 356. As discussed previously, the leading edge of locking sleeve 360 includes teeth 370 that engage with corresponding teeth 372 on the trailing edge of locking nut 356. As a result, when locking sleeve 360 is engaged with locking nut 356, locking sleeve 360 will prevent locking nut 356 from rotating. Similarly, when locking sleeve 360 is disengaged from locking nut 356, locking nut 356 is free to rotate. Thus, movement of locking sleeve 360 controls whether rod 354 is free to translate axially within locking nut 356. One set of teeth 370 or 372 may be ratcheted so that nut 356 can only rotate in one direction when engaged with locking sleeve, i.e., rod 354 is free to telescope in one direction but not the other. Locking sleeve 360 is coupled to a piston assembly 376 by a connecting stem 378. Piston assembly 376 is positioned on the other side of a brake pipe pressure chamber 380 in fluid communication with brake pipe port 322 so that pressure in chamber assembly 380 will move sleeve 360 axially from the engaged position to the disengaged position. A spring 382 in housing 350 biases locking sleeve 360 into the engaged position in the absence of sufficient brake pipe pressure in chamber assembly 380. Locking sleeve 360 is also coupled to a manual release stem 384 that extends out of housing 350 to form manual release 328. Stem 384 includes an eccentric post 386 that, when rotated, will engage a shoulder 388 on sleeve 360 to move locking sleeve 360 out of engagement with locking nut 356 against the bias of spring 382. Parking brake cylinder 312 will thus prevent brake cylinder 314 from returning to the brakes released position even if brake cylinder pressure is exhausted from inlet port 320. When a threshold amount of brake pipe pressure is supplied to chamber assembly 380, however, locking sleeve 360 will be forced against the bias of spring 382 and out of engagement with locking nut 356 so that rod 354 is free to move and brake cylinder 314 can return to the brakes released position.

When installed in a truck mounted brake system, automatic parking brake system 310 will be automatically be deactivated when the hand brake is applied, unlocking allowing the brake rigging to release at or below a predetermined control pressure. For example, Table 2 below identifies the maximum release pressures achievable by automatic parking brake system 310 at various initial brake pipe charges.

TABLE 2

| Initial Brake Pipe Charge | Maximum Parking Brake Release Pressure |
|---|---|
| 70 psi | 45 psi |
| 80 psi | 60 psi |
| 90 psi | 70 psi |
| 110 psi | 90 psi |

The release pressure threshold may be verified by initiating an emergency brake application from the initial brake pipe charge as indicated in Table 2. The hand brake may then be fully applied so that 3,350 lbs. of force has been generated in the vertical chain. The hand brake may then be released and, using the manual release feature of a brake control valve, the pneumatic brake application may be released. The brake pipe may then be recharged to ensure that the automatic parking brake system at or below the listed value.

What is claimed is:

1. An automatic parking brake, comprising:
   a rail car brake beam;
   a housing associated with the rail car brake beam;
   a locking nut positioned in the housing for rotation within the housing and having a post that extends out of the housing;
   a rail car brake lever secured to the post of the locking nut so that the locking nut will rotate with the rail car brake lever;
   a locking sleeve positioned in the housing and fixed against rotation within the housing, wherein the locking sleeve is moveable axially within the housing between a first position where the locking sleeve is engaged with the locking nut to prevent rotation of the locking nut within the housing and a second position where the locking sleeve is disengaged from the locking nut so that the locking nut is allowed to rotate within the housing.

2. The automatic parking brake of claim 1, further comprising a spring positioned in the housing to provide a biasing force that biases the locking sleeve into the first position.

3. The automatic parking brake of claim 2, further comprising a chamber in communication with a source of brake pipe pressure and the locking sleeve so that when a predetermined amount of brake pipe pressure is supplied to the chamber the locking sleeve will be biased axially into the second position over the biasing force of the spring.

4. The automatic parking brake of claim 3, further comprising a manual release connector associated with the locking sleeve and positioned so that when a second biasing force that exceeds the first biasing force of the spring is applied to the manual release connection, the locking sleeve will move axially from the first position to the second position.

5. The automatic parking brake of claim 4, wherein the locking sleeve and the locking nut each include a set of corresponding teeth that will interlock when the locking sleeve is in the second position.

6. The automatic parking brake of claim 5, wherein the locking sleeve includes a shoulder adjacent to the brake pipe pressure chamber.

7. The automatic parking brake of claim 6, wherein the manual release connector is positioned axially opposite from the post of locking nut.

* * * * *